F. C. SCHMITZ.
PROCESS OF MANUFACTURING PHOSPHORIC ACID.
APPLICATION FILED FEB. 4, 1914.
1,142,371.
Patented June 8, 1915.
2 SHEETS—SHEET 1.
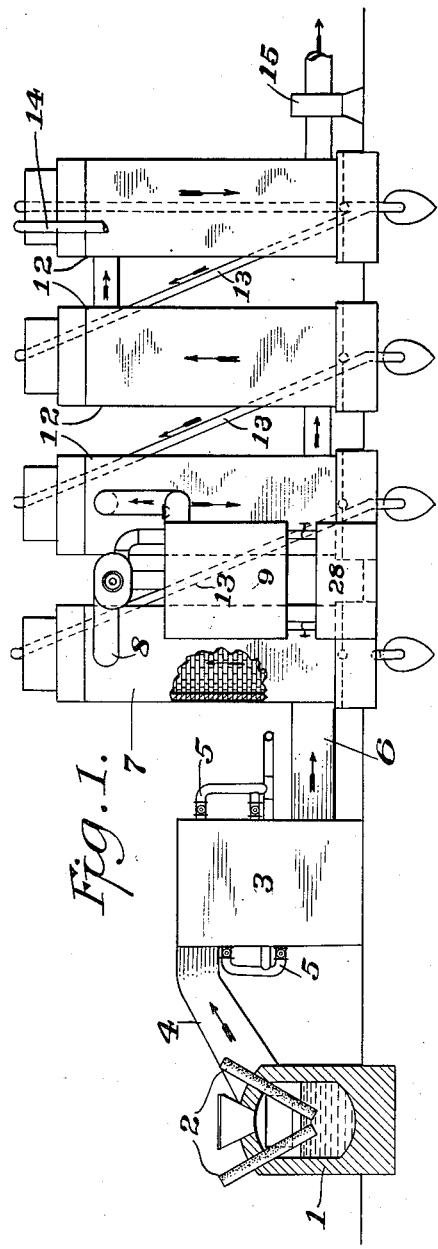
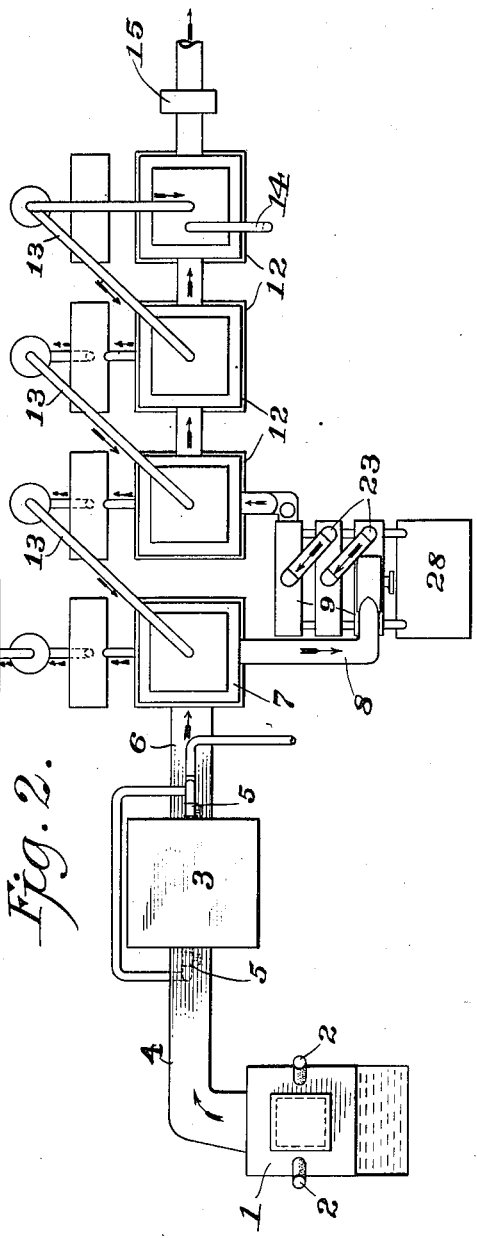
Witnesses:
Inventor
Frank C. Schmitz
By his Attorneys F. C. SCHMITZ.
PROCESS OF MANUFACTURING PHOSPHORIC ACID.
APPLICATION FILED FEB. 4, 1914.
1,142,371.
Patented June 8, 1915.
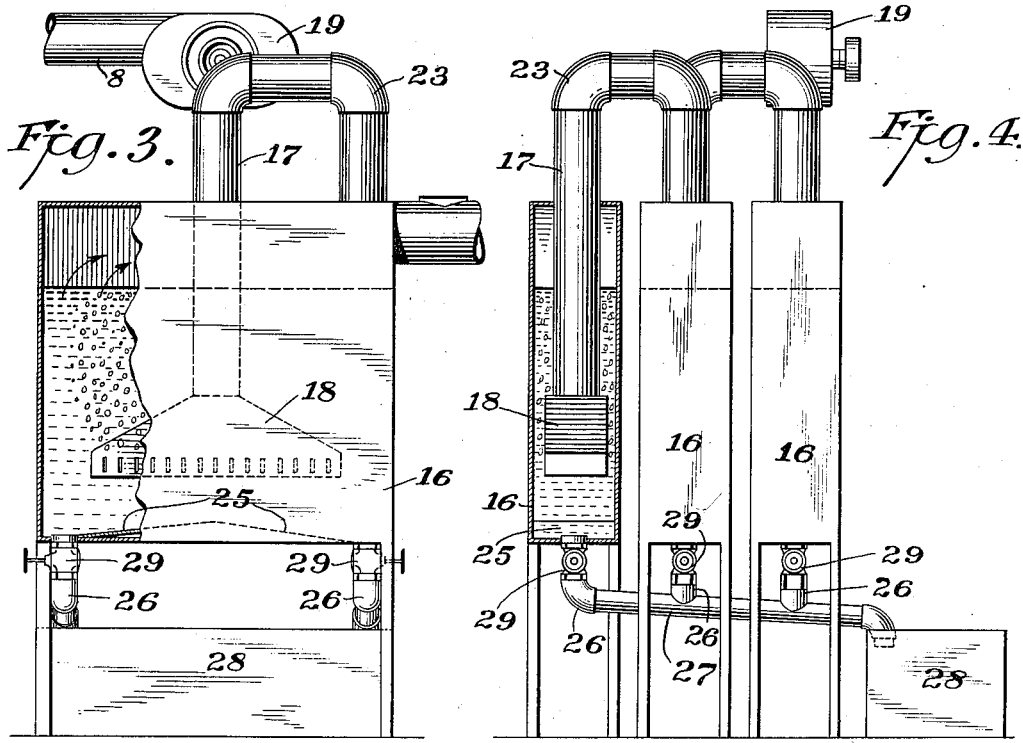
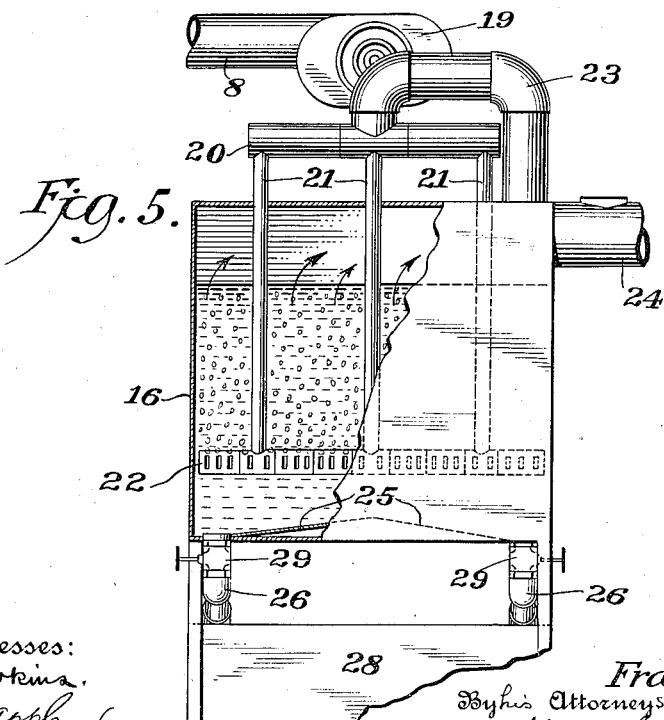

UNITED STATES PATENT OFFICE.

FRANK C. SCHMITZ, OF NEW YORK, N. Y.

PROCESS OF MANUFACTURING PHOSPHORIC ACID.

1,142,371.   Specification of Letters Patent.   Patented June 8, 1915.

Application filed February 4, 1914. Serial No. 816,595.

*To all whom it may concern:*

Be it known that I, FRANK C. SCHMITZ, a citizen of the United States, residing at New York, in the county of New York and State of New York, have invented new and useful Improvements in Processes of Manufacturing Phosphoric Acid, of which the following is a specification.

My present invention relates to an improved process of and apparatus for washing and absorbing soluble, gases such as phosphorus pentoxid, $P_2O_5$, in the condensation and concentration of such gases, as in the manufacture of phosphoric acid, and the prime object of the invention is to overcome a serious objection or drawback found to exist in the process and also the apparatus now employed in the manufacture of such acid.

It is known that when a mixture of phosphatic material such as phosphate rock, a reducing agent, such as carbon, and an acid flux, such as silicious material, sand or feldspar, is introduced into a properly constructed furnace, as for instance an electric furnace, and such mixture is subjected to the action of a high heat, such as the heat of an electric furnace, it will become molten and phosphorus (P) together with other products in gaseous form will be liberated which gases may be collected in a proper apparatus, calcium silicate remaining in the furnace in the form of slag. The formula for the principal part of the above reaction is as follows:

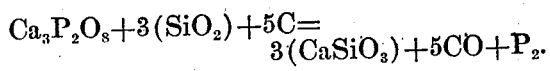

In manufacturing phosphoric acid from phosphorus made in the above manner, the carbon monoxid (CO) and phosphorus (P) in gaseous form, are passed into a suitable oxidizing chamber where sufficient oxygen is introduced to thoroughly oxidize them respectively into carbon dioxid ($CO_2$) incidentally, and phosphorus pentoxid ($P_2O_5$) principally. These gases, namely, carbon dioxid, ($CO_2$) phosphorus pentoxid ($P_2O_5$) and nitrogen (N) (if air is employed as an oxidizer) mechanically mixed are then passed into an absorption system, usually consisting of a concentrating tower, as for instance a Glover tower, and then through one or more condensing towers, such for instance as Gay Lussac towers, the phosphoric acid being collected in the several towers as the gases pass therethrough.

Short period runs of this process of producing phosphoric acid have been found to be very efficacious from a practical and commercial standpoint and high yields of the acid have been secured in the practical operation of the process on a large scale during such short runs; but attempts at a continuous or a long run operation of the process disclosed a very serious draw-back or objection which rendered continuous operation for any considerable period of time a practical impossibility, and the object of the present invention is therefore to overcome such difficulty whereby the process may be carried on continuously for an indefinite period.

It has been found that the gases passing from the concentrating tower into the condensing towers contain relatively large quantities of certain impurities which I believe to be fluoro silicate or combinations of fluorin and silica as well as phosphoric acid combinations, in an insoluble form, and that these impurities, during the condensing operation form a mud or sediment that collects in and upon the checkerwork interior of the towers and very soon entirely closes or so clogs the passages formed by such checkerwork as to prevent free passage therethrough of the gases to be condensed. This requires the entire operation to be stopped in order that the towers may be washed, to remove the impurities, thus materially reducing the phosphoric acid yield for a given period and otherwise interfering with the practical carrying on of the process, especially where an electric furnace is employed to melt the material from which the acid is being formed.

I propose to overcome the objection referred to, and have actually overcome it, in the practical operation of the process, by washing or scrubbing the phosphorus pentoxid after it leaves the concentrating tower, in such a way as to eliminate or remove therefrom and collect practically all of the impurities contained therein, and at the same time absorb a large percentage of the phosphoric acid content of the gases, so that the resulting gases, after having been washed, may be passed through the absorption or condensing towers, or, the washing and scrubbing apparatus according to the present invention may be so constructed as to make it possible and entirely feasible to dispense with the condensing towers altogether or at least reduce the number thereof.

The invention consists in the novel process and novel features thereof hereinafter described, all of which contribute to produce an efficient process for manufacturing phosphoric acid.

A preferred embodiment of my invention will be particularly described in the following specification, while the broad scope of my invention will be pointed out in the appended claims.

In order to enable others to understand and practise my said process and construct the proper apparatus for carrying the process into effect, I will now describe the same in detail, reference being made for this purpose to the accompanying drawing wherein—

Figure 1 is an elevation, partly in section, of a complete phosphoric acid plant, in which my process can be practised. Fig. 2 is a plan view of the same. Fig. 3 is an end view partly in section of the washing and absorbing apparatus. Fig. 4 is a side elevation, and Fig. 5 is an end view showing a slight modification.

I have elected to describe my process associated with a particular type of apparatus, plant or system for manufacturing phosphoric acid, but this showing is only by way of example, and is not to be considered as restrictive, as I am aware that the apparatus as well as the process may be otherwise arranged and practised without departing from the spirit of the invention.

In the said drawings and referring more particularly to Figs. 1 and 2 thereof, the reference numeral 1 designates an electric furnace of any approved construction through the top wall of which the carbon or other electrodes 2 extend into the furnace chamber wherein the material to be treated is placed, such material consisting, for instance, of phosphate rock having mixed therewith a suitable acid flux such as silicious material and a reducing agent such as carbon.

The reference numeral 3 designates an oxidizing chamber into which the gases to be oxidized pass or through which the gases flow from the furnace through the connecting flue 4 and wherein they are subjected to the action or actions of a countercurrent or countercurrents of oxygen entering the chamber through the pipe or pipes 5. I prefer to employ the oxidizing chamber shown and described in my co-pending application, Serial No. 813,701, filed Jan. 22, 1913. From the oxidizing chamber 3 the oxidized gases pass through the flue 6 into a concentrating tower 7, of any approved construction, such for instance as a Glover tower, and from thence the gases pass by way of flue 8 into my improved washing and absorbing apparatus indicated in Figs. 1 and 2 generally by the numeral 9, and which apparatus will presently be described in detail.

The gases pass from the oxidizing chamber 3 into the concentrating tower 7 at a high temperature and are here acted upon by a spray or shower of dilute phosphoric acid pumped from the washing and absorbing apparatus or from one of the absorption towers, which sprayed or showered dilute acid is concentrated to about a 50% strength, the acid leaving the bottom of the tower and passing into a suitable storage tank or receptacle 11, Fig. 2.

Where the plant employed has embodied therein, in addition to the washing and absorbing apparatus 9, referred to, one or more condensing or absorption towers 12, the weaker gases leaving the washing apparatus pass successively into the several absorption towers in each of which they are acted upon by a spray or shower of dilute phosphoric acid collected at the bottom of each of said towers, the collected acid from one tower being pumped through pipe 13 into the tower ahead or in advance so that the gases in each successive tower are sprayed with acids of different strength, the stronger acid from the washing and absorbing apparatus being pumped directly into the concentrating tower 7, and the weaker acid from the last absorption tower 12 being pumped into the next to the last tower and so on through the series of towers where more than one tower is employed. Usually water is sprayed or showered through a pipe 14, into the last tower of the system, when the operation is started, but after the operation has been carried on for a sufficient length of time, the weak acid from the last or from any other of the towers or from the washing and absorbing apparatus may be sprayed into the last tower. I prefer to connect a suction fan 15 to the last tower to assist in drawing the gases through the system.

It is a well known fact that when a suitable mixture of phosphate rock, silica, and carbon is introduced into a properly constructed air tight electric furnace, and an alternating current of electricity is discharged through the mass, phosphorus together with other products in gaseous form pass out of the furnace and may be collected in proper apparatus, calcium silicate remaining in the furnace as slag. The formula for the principal part of the reaction taking place in the furnace is as follows:

$$Ca_3P_2O_8 + 3(SiO_2) + 5C = 3(CaSiO_3) + 5CO + P_2.$$

The gaseous products of this reaction are carried from the reaction zone of the furnace to a retort or chamber into which oxygen is admitted, and there oxidized into carbon dioxid ($CO_2$) and phosphorus pentoxid ($P_2O_5$), according to the formulæ

$$CO + O = CO_2$$
$$P_2 + O_5 = P_2O_5.$$

While it is probably true that some carbon dioxid ($CO_2$) is produced in the furnace and some oxidized phosphorus is also produced, the latter in one or more forms, the reaction in the main is as above described. The formation of phosphorus pentoxid in the electric furnace itself is not commercially practicable because of the destructive action of oxygen on the electrodes, and because of the difficulty in obtaining a perfect union or mixture between the phosphorus and the oxygen under furnace conditions.

The oxidizing chamber may be constructed as a part of the furnace, as in the form of a stack, shaft, or flue, through which the ore is or is not fed into the reaction zone, or it may preferably be a separate chamber of suitable design connected to the furnace, where oxygen in proper amount may be intimately mingled with the gaseous products of the furnace reaction to insure the above mentioned oxidizing reactions.

My improved washing and absorbing apparatus, as more clearly shown in Figs. 3, 4, and 5, consists of one or more similarly constructed absorption tanks 16, three such tanks being shown in the present instance, although it is to be understood that I may employ a greater or lesser number of tanks depending upon the operation to be carried on. Each tank contains a body or column of liquid absorbent, such as a weak solution of phosphoric acid or water, which nearly fills the tank, except for a gas collecting space above the level of the liquid therein.

The gases coming from the concentrating tower 7 by way of flue 6 pass into the first tank 16 of the series through a flue 17, the said flue extending below the surface of the liquid absorbent to a point near the bottom of the tank, and carrying at its lower end some suitable means for causing the gases to be discharged therefrom preferably in a finely divided state directly into the body of liquid absorbent so that they will be forced to bubble up through the liquid within the tank and then pass on therefrom into the next tank or succeeding tanks.

By reason of the fact that the gases are discharged, in a finely divided state, directly into the body of liquid absorbent, beneath the surface or level thereof, and are caused to bubble up therethrough, as shown in Fig. 3, a large percentage of the acid in the gases will be absorbed, while the impurities, consisting of fluoro-silicate or insoluble combinations of phosphoric acid fluorin and silica, will be precipitated and collected at the bottom of the tank in the form of a thin mud which may be drawn off from time to time as required, and as hereinafter explained. After passing through the liquid absorbent in the first tank, the gases pass on through the other tanks successively where the same absorbing, purifying and collecting actions takes place.

The means for discharging the gases into the body or column of liquid absorbent as shown in Fig. 3, consists of what is known as a "cracker pipe", the same having a relatively broad and narrow head 18 provided with slots or openings in its opposed side and end walls through which the gases pass in a finely divided state, the said gases being forced into and up through the body of absorbent solution by means of a fan 19 connected to the flue 17, or some other suitable means may be employed to positively force the gases through the absorbent solution in the absorption tanks, such for instance as a suction fan 19, at the end of the system.

Instead of the means just referred to for causing the gases to be discharged into the body or column of liquid absorbent, as shown in Figs. 3 and 4, I may employ in lieu thereof the construction of means illustrated in Fig. 5, which instead of consisting of a cracker pipe, may consist of a gas distributer head 20, located above each of the tanks from which lead-pipes 21 extend down into the tanks below the level of the body or column of liquid absorbent, the lead-pipes 21 being interconnected at their lower ends by means of a slotted header 22 through which the gases pass. If more than one absorption tank is employed the gases collect in the upper part of the tank above the surface of the liquid absorbent, pass by means of flues 23 into the next tank or tanks, and finally from the last tank of the series the gases pass through an outlet flue 24 into the absorption towers 12, shown in Fig. 1, if such absorption towers are employed. In some instances it will be found that if the gases have passed through several absorption or washing tanks 13 as herein referred to, practically all of the acid will be absorbed, and such gases may then be discharged into the atmosphere, or otherwise disposed of.

By causing the gases from the concentrating tower 6 to pass into a washing and absorbing apparatus, such as above referred to wherein the gases are liberated directly into and beneath the surface of a body or column of liquid absorbent, such for instance as a weak solution of the acid to be obtained or through water, and caused to bubble up through the said liquid absorbent, it has been found from actual working of the process in this manner and on a large scale that a very large percentage of the acid in the gases will be absorbed and the impurities contained in the gases and which are believed to consist of fluorosilicate or combinations of fluorin and silica, as well as phosphoric acid combinations in the insoluble form, will be precipitated and collected in the bottom of the tank or tanks in the form of a thin mobile mud or sediment and as the gases pass on from one absorption tank to the other the aforesaid impurities are more or less eliminated and precipitated so that if these gases are then passed on through absorption towers such as 12, illustrated in Figs. 1 and 2 these towers will not be choked or clogged by the mud deposits or impurities as before referred to, and the process of collecting the gases in aqueous form in this way may be carried on practically continuously.

Each of the tanks 13, is preferably provided with oppositely inclined bottom sections 25, to direct the mud sediment toward the opposite ends of the tanks, and from the lowest point of each bottom section leads a discharge pipe 26, each of said pipes 26, at the opposite ends of the tanks being connected to an inclined drain pipe 27, that leads to and discharges in a settling tank 28, as more clearly shown in Fig. 2. The discharge pipes 26 are each provided with a valve or gate 29, to permit the mud to be discharged from the tanks whenever required directly into the settling tank 28.

I do not wish to be understood as limiting myself to the precise process or embodiment of my invention described as I am aware that changes or additions may be made without departing from the spirit of the invention, the showing here being merely by way of example.

What I claim is:—

1. The process herein described of manufacturing phosphoric acid which consists in rendering a mixture consisting of phosphatic material, a flux and a reducing agent, fluid by subjecting the mixture to a high heat to form gases containing phosphorus, passing the gases through the passages of absorption towers to collect the acid in aqueous form, and causing the gases to pass through a body of liquid before reaching said passages to collect the solid impurities therefrom and thus prevent the formation of obstructing deposits in the said passages in the towers.

2. The process herein described of manufacturing phosphoric acid, which consists in rendering a mixture of phosphatic material, an acid flux and a reducing agent, fluid by subjecting the mixture to high heat to form gases or vapors containing phosphorus, then passing such gases or vapors through a chamber and mixing oxygen therewith to break up and oxidize the gases or vapors to form phosphorus pentoxid, passing the pentoxid through passages in a checker-work absorption tower operating on the countercurrent principle, and causing the pentoxid after leaving the oxidizing chamber to enter and bubble up through a body of liquid before entering the tower to collect the impurities therefrom and thus prevent choking of the passages in the tower by the accumulation therein of impurity deposits.

3. The process herein described of manufacturing phosphoric acid which consists in rendering a mixture consisting of phosphatic material, a flux and a reducing agent, fluid by subjecting the mixture to a high heat to form gases containing phosphorus, oxidizing such gases to form phosphorus pentoxid, passing the pentoxid gases through the passages of absorption towers to collect the acid in aqueous form and causing the phosphorus pentoxid to pass through a body of liquid before reaching said passages to collect the solid impurities therefrom and thus prevent the formation of obstructing deposits of the said passages in the towers.

4. The process herein described of manufacturing phosphoric acid which consists in rendering a mixture consisting of phosphatic material, a flux and a reducing agent, fluid by subjecting the mixture to a high heat to form gases containing phosphorus, mixing air with the gases to form phosphorus pentoxid, then spraying such pentoxid with a weak solution of phosphoric acid, then passing the phosphorus through the passages of absorption towers to collect the acid in aqueous form and causing the gases to pass through a body of liquid before reaching said passages to collect the solid impurities therefrom and thus prevent the formation of obstructing deposits in the said passages in the towers.

In testimony whereof I have hereunto set my hand in presence of two subscribing witnesses.

FRANK C. SCHMITZ.

Witnesses:
  J. GRANVILLE MEYERS,
  C. H. BICKERTON.